(12) United States Patent
Nesbitt et al.

(10) Patent No.: US 7,509,633 B2
(45) Date of Patent: Mar. 24, 2009

(54) SYSTEM AND METHOD FOR GRID-BASED DISTRIBUTION OF JAVA PROJECT COMPILATION

(75) Inventors: Richard Elderkin Nesbitt, Holly Springs, NC (US); Brian Marshall O'Connell, Cary, NC (US); Kevin Edward Vaughan, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/014,593

(22) Filed: Dec. 16, 2004

(65) Prior Publication Data

US 2006/0136881 A1   Jun. 22, 2006

(51) Int. Cl.
*G06F 9/45* (2006.01)
(52) U.S. Cl. ..................................... 717/140
(58) Field of Classification Search .................. 717/101, 717/103, 107, 108, 114, 116, 119, 120, 121, 717/122, 132, 136, 137, 140, 142, 144, 146, 717/148, 150, 151, 152, 153, 154, 155, 156, 717/157, 158, 159, 160, 161, 169, 138, 139, 717/141; 707/2, 101, 203, 205; 712/1, 15, 712/28

See application file for complete search history.

(56) References Cited

U.S. PATENT DOCUMENTS

| | | | |
|---|---|---|---|
| 5,361,357 A | 11/1994 | Kionka | |
| 5,442,792 A * | 8/1995 | Chun | 717/155 |
| 5,826,089 A * | 10/1998 | Ireton | 717/146 |
| 5,999,734 A * | 12/1999 | Willis et al. | 717/149 |
| 6,092,097 A | 7/2000 | Suzuoka | |
| 6,219,833 B1 | 4/2001 | Solomon et al. | |
| 6,412,109 B1 | 6/2002 | Ghosh | |
| 6,874,141 B1 * | 3/2005 | Swamy et al. | 717/144 |
| 7,197,747 B2 * | 3/2007 | Ishizaki et al. | 717/146 |
| 7,325,232 B2 * | 1/2008 | Liem | 718/102 |
| 2001/0011371 A1 | 8/2001 | Tang | |
| 2002/0124012 A1 | 9/2002 | Liem et al. | |
| 2003/0014740 A1 | 1/2003 | Aubertine | |
| 2003/0037319 A1 | 2/2003 | Narang | |
| 2003/0135724 A1 | 7/2003 | Krishnamurthy et al. | |
| 2004/0068716 A1 | 4/2004 | Stevens | |

\* cited by examiner

*Primary Examiner*—Wei Y Zhen
*Assistant Examiner*—Jyoti D Dave
(74) *Attorney, Agent, or Firm*—Whitham, Curtis, Christofferson & Cook, PC; John R. Pivnichney

(57) ABSTRACT

A system for automatically segmenting the compilation of a large Java project under a controller node to a grid of slave nodes so as to reduce build time. A build tree scanner at the controller node sizes the number of files in the project and the length of each source file. Each slave node has a complete and synchronized set of all compilable units in the project. The controller node automatically segments the source files into a number of filesets commensurate with the number and resource capacities of slave nodes available for the build, allocates the filesets to the slave nodes, and automatically generates build filesets from a master dependency tree built from dependency trees constructed by each slave node. The build sets are then equitably allocated to the slave nodes. Then the targets are reaped and placed on the controller node, which performs post-compilation tasks.

17 Claims, 10 Drawing Sheets

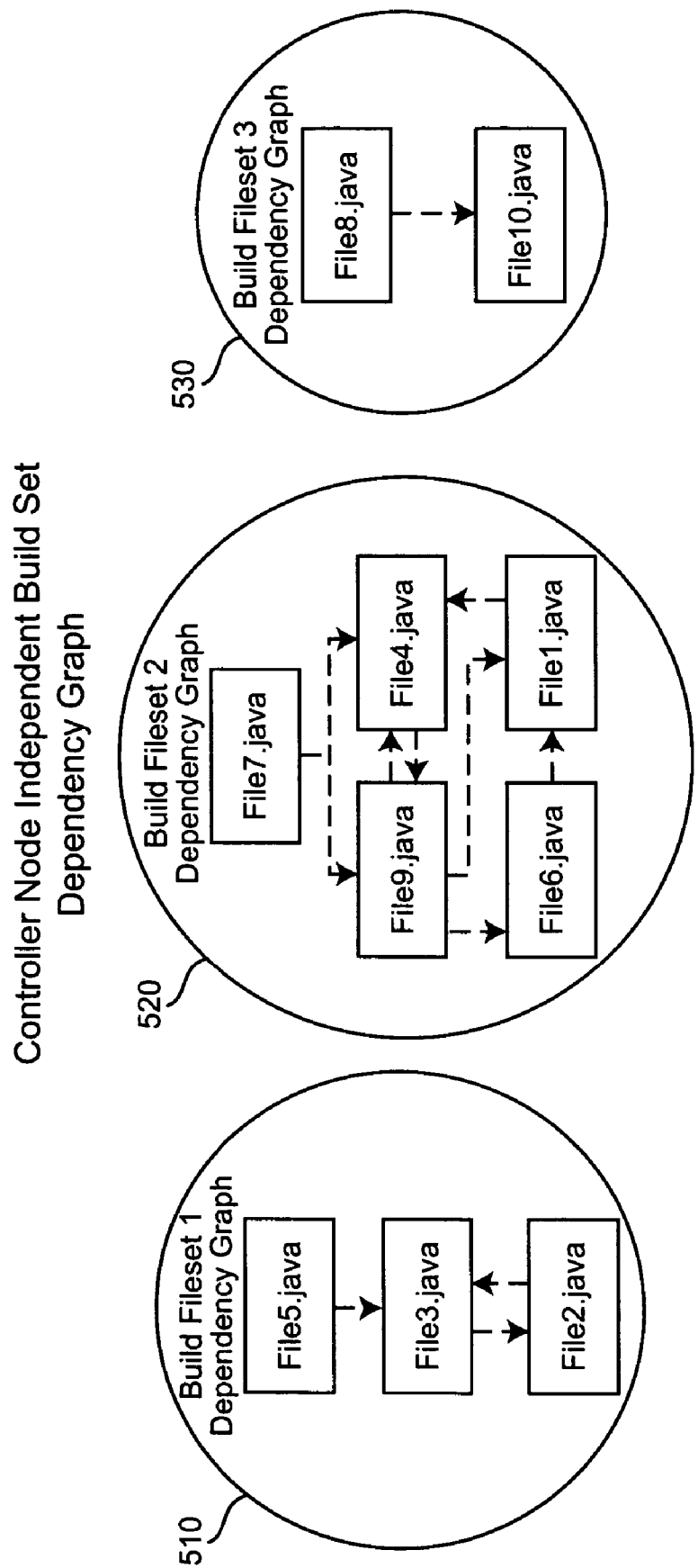

SYSTEM AND METHOD FOR GRID-BASED DISTRIBUTION OF JAVA PROJECT COMPILATION

BACKGROUND OF THE INVENTION

1. Field of the Invention

The present invention generally relates to compilation of large projects in a multiprocessing environment, and in particular to such compilation for large Java projects.

2. Background Description

In the prior art large Java projects require lengthy compile times. Solutions for the problem of lengthy compile times for large projects exist in other languages, such as C and C++. These solutions benefit from the fact that those languages do not contain automatic, internal dependency resolution mechanisms. Java uses those mechanisms to ease the process of building Java projects. However, those same mechanisms complicate the process of automatically distributing a compilation of a Java project across multiple systems. Coarse-grained solutions to this problem exist that require the developer or build team to segment the build process by hand. This is time consuming, error prone and will rarely yield the best segmentation solution for large projects.

There are a variety of methods that are used to improve the compilation time for large projects. They include items such as: using higher capacity equipment (memory and processor power); performing conditional compilation effectively through the use of tools such as make, gmake, etc; manually partitioning the large project into isolated subprojects which have no interdependencies and then farming the compilation of these subprojects out to separate machines.

Languages such as C/C++ require the manual creation of a Makefile in order to outline all of the dependencies between the source files in a large system. Since that work is already being done, it becomes easier to segment the builds manually (as in the manual partition of the large project into isolated subprojects). As stated, this is a very error-prone process.

Java's automatic dependency mechanisms complicate this process as the Java compiler automatically compiles what is necessary for recompilation, as opposed to other languages where the dependencies are determined externally from the compiler. So when one attempts to manually segment the Java application and spread the compilation to separate machines—the Java compiler potentially ends up compiling much more than is needed because there is no true knowledge of all of the dependencies. A manual approach is a labor intensive and therefore error prone process, and would be impractical for a large Java project. Therefore there is a need for an automated approach.

U.S. Pat. No. 5,361,357 to Kionka discloses a method and apparatus for optimizing computer file compilation. The invention relates to the large scale compilation of software source code and optimizing the sequence of source code compilations involving source code files residing in numerous different directories. While Kionka attempts to perform optimizations of source code compilation time through the distribution of compilations, it does not provide a system for determining and managing dependencies in a set of files for distributed compilation. Therefore there remains a need for an automated approach for large Java projects that determines and manages dependencies in a set of files and reduces build time by distribution of buildsets to a grid of processors.

SUMMARY OF THE INVENTION

It is therefore an object of the present invention to provide a system and method of compilation of large Java projects that substantially improves build time.

Another object of the invention is to optimize build time of a large Java project by distributing file builds over a grid of multiple processors.

A further object of the invention to provide a mechanism whereby the system for distributed compilation advantageously accumulates knowledge of dependencies in a large Java project and uses that knowledge to minimize duplication of file builds over a grid of multiple processors doing the compilation.

The invention provides an automated process for segmenting a Java project into discrete, independent build filesets and a method for distributing the build fileset information across a grid or cluster of computer systems and performing the subsequent compilation invocations.

The method of the invention uses a plurality of processor nodes including a controller node, each capable of performing a Java compilation and capable of executing a Java dependency scanner. Every processor node is synchronized with every compilation unit in the Java project. A build tree scanner is run on the controller node, which segments and equitably distributes to each processor node a list of files changed since a last compilation. The changed files become target files for the compilation. A dependency tree is built at each processor node, comprising a dependency graph for each file in the segmented list distributed to the processor node, which then sends the tree to the controller node. The controller node combines these dependency trees into a master dependency tree, and then creates and equitably allocates to each processor node build filesets based on the master dependency tree and prior compilation time information. Each processor node builds each file in each buildset allocated to the processor node, recording the time required for each build. Target files and corresponding build times are then reaped onto the controller node, which performs post compile tasks.

BRIEF DESCRIPTION OF THE DRAWINGS

The foregoing and other objects, aspects and advantages will be better understood from the following detailed description of a preferred embodiment of the invention with reference to the drawings, in which:

FIG. 5 shows independent build sets generated at the controller node.

DETAILED DESCRIPTION OF A PREFERRED EMBODIMENT OF THE INVENTION

Figure 1:
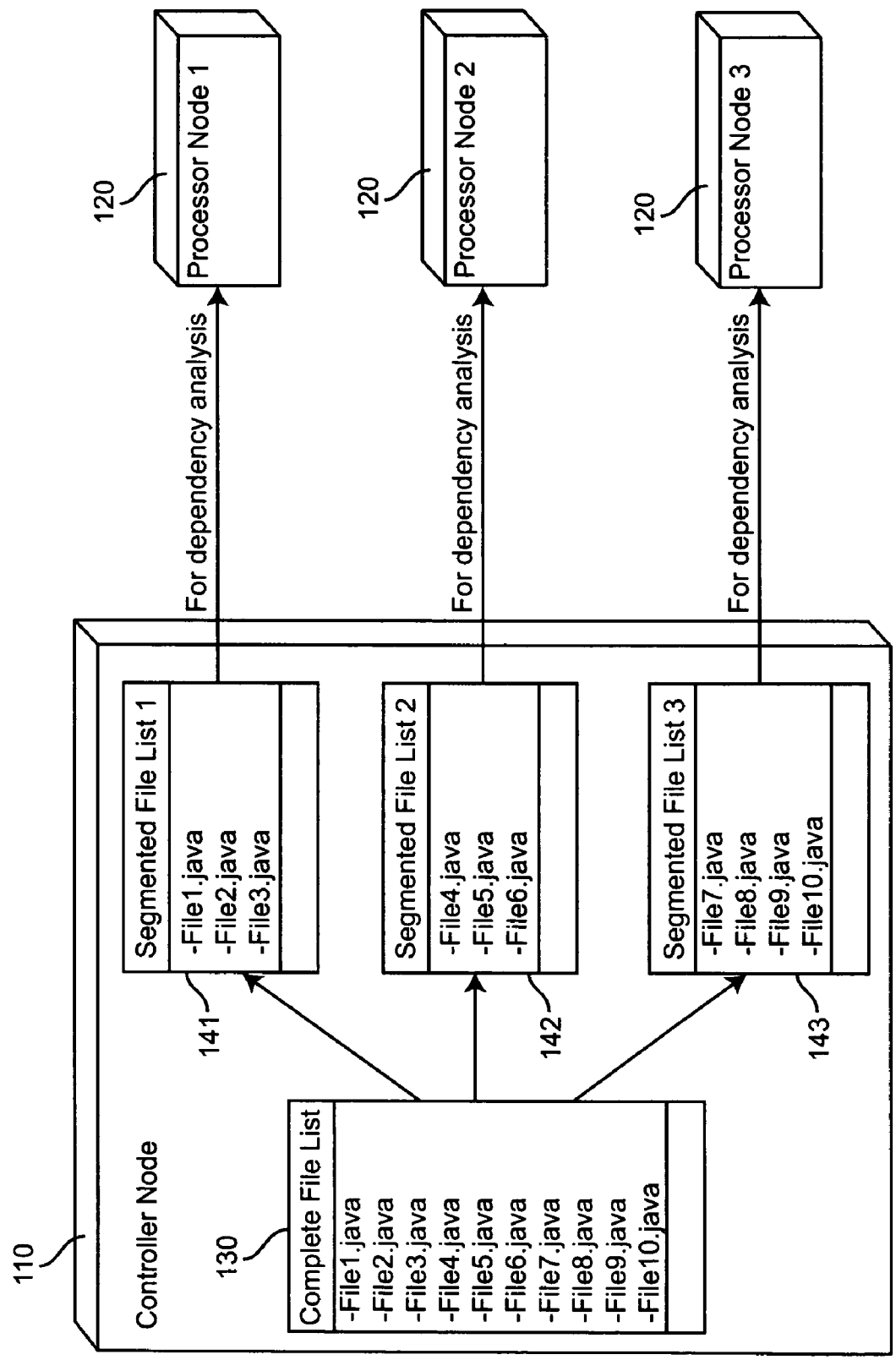
FIG. 1 is a diagram showing a file list segmented into separate lists for distribution to processor nodes for dependency analysis.
Figure 2A:
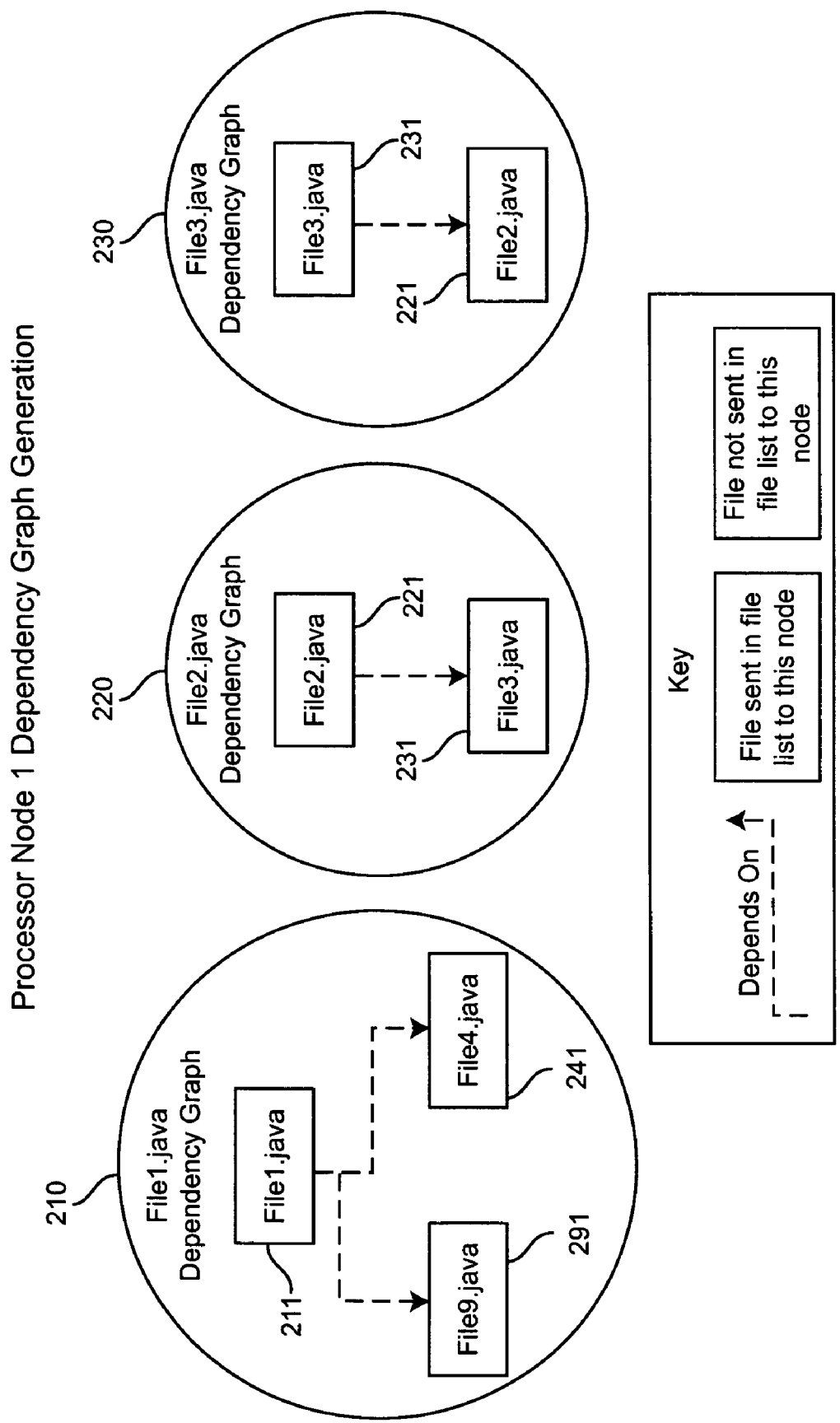
FIGS. 2A, 2B and 2C are dependency graphs for respective file lists distributed to processor nodes 1, 2 and 3.
Figure 2B:
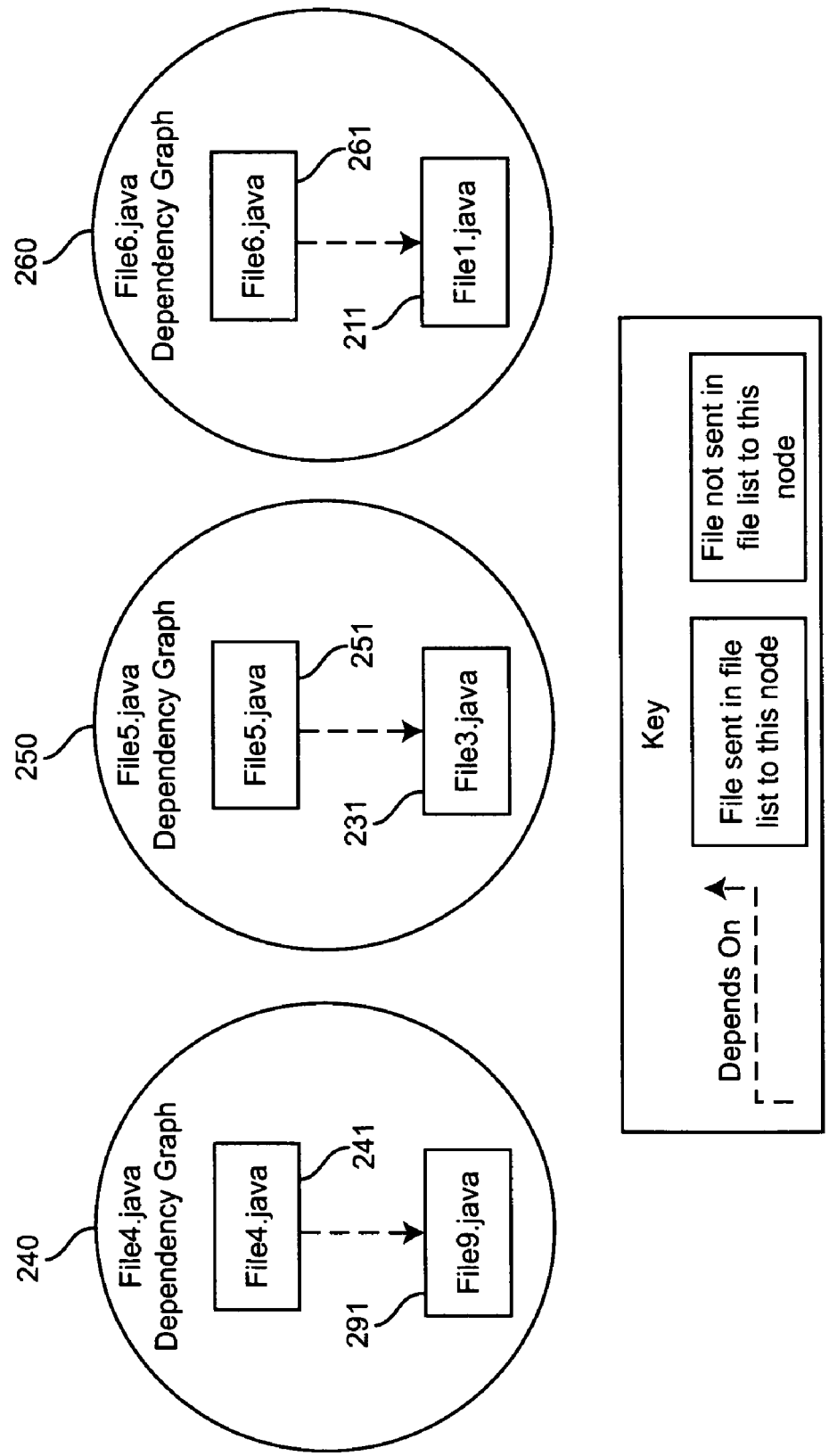
Figure 2C:
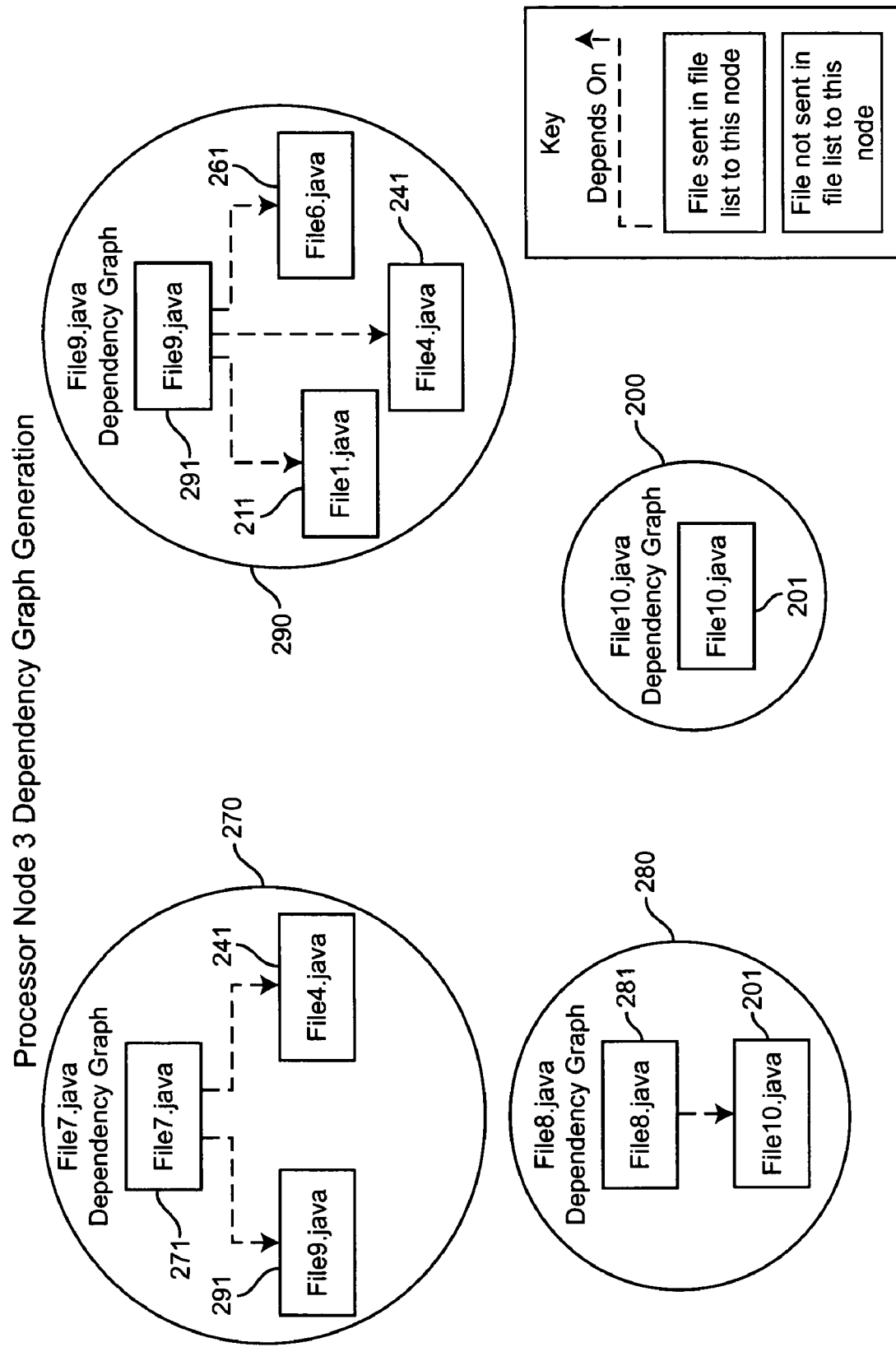

Referring now to the drawings, and more particularly to FIG. 1, there is shown the controller 110 and compilation nodes 120 for using multiple processors to compile a large Java project. The invention is implemented with the following steps:

1. The controller 110 synchronizes every node 120 with every compilation unit in the Java project.
2. The controller 110 performs a scan for every file changed since the last compilation (or all files if never compiled before), finding out the length of each source file. This list is segmented equitably based upon number of lines in each of the files, so that each compilation node will have a list of files that are to be compiled. For the example shown in FIG. 1, the complete list of files changed since the last compilation 130 is segmented equitably into file lists 141, 142 and 143.
3. The controller 110 sends each compilation node's list to that compilation node. For the example shown in FIG. 1, file lists 141, 142 and 143, are sent to their respective compilation nodes 120 (processor nodes 1, 2 and 3).
4. Each compilation node 120 runs a dependency scanner for each file in the fileset, creating a dependency tree. For the example shown in FIG. 1, the respective dependency trees for each compilation node are shown in FIGS. 2A, 2B and 2C, respectively. In the example, it will be observed in FIG. 2A that while dependency graphs 220 and 230 for File2.java and File3.java, respectively, show dependency upon other files (File3.java and File2.java, respectively) in the file list 141 being analyzed by processor node 1, dependency graph 210 for File1.java shows a dependency upon files (File9.java 291 and File4.java 241) not included in the file list 141 sent to processor node 1. Similarly, FIG. 2B shows dependency graphs 240, 250 and 260 for each of the files (File4.java 241, File5.java 251 and File6.java 261, respectively) in file list 142 sent to processor node 2. These files depend upon files (File9.java 291, File3.java 231 and File1.java 211) not included in the file list 142.

Turning now to FIG. 2C, the example of dependency analysis by processor node 3 of file list 143 shows: dependency graph 270 shows that File7.java 271 depends upon one file File9.java 291 contained in file list 143 and one file File4.java 241 not included in file list 143; dependency graph 280 shows that File8.java 281 depends upon File10.java 201, which is contained on file list 143; dependency graph 290 shows that File9.java 291 depends on three files (Java1.java 211, Java4.java 241 and Java6.java 261) none of which is contained on file list 143; and dependency graph 200 shows that File10.java 201 is not dependent on any other files.

Figure 3:
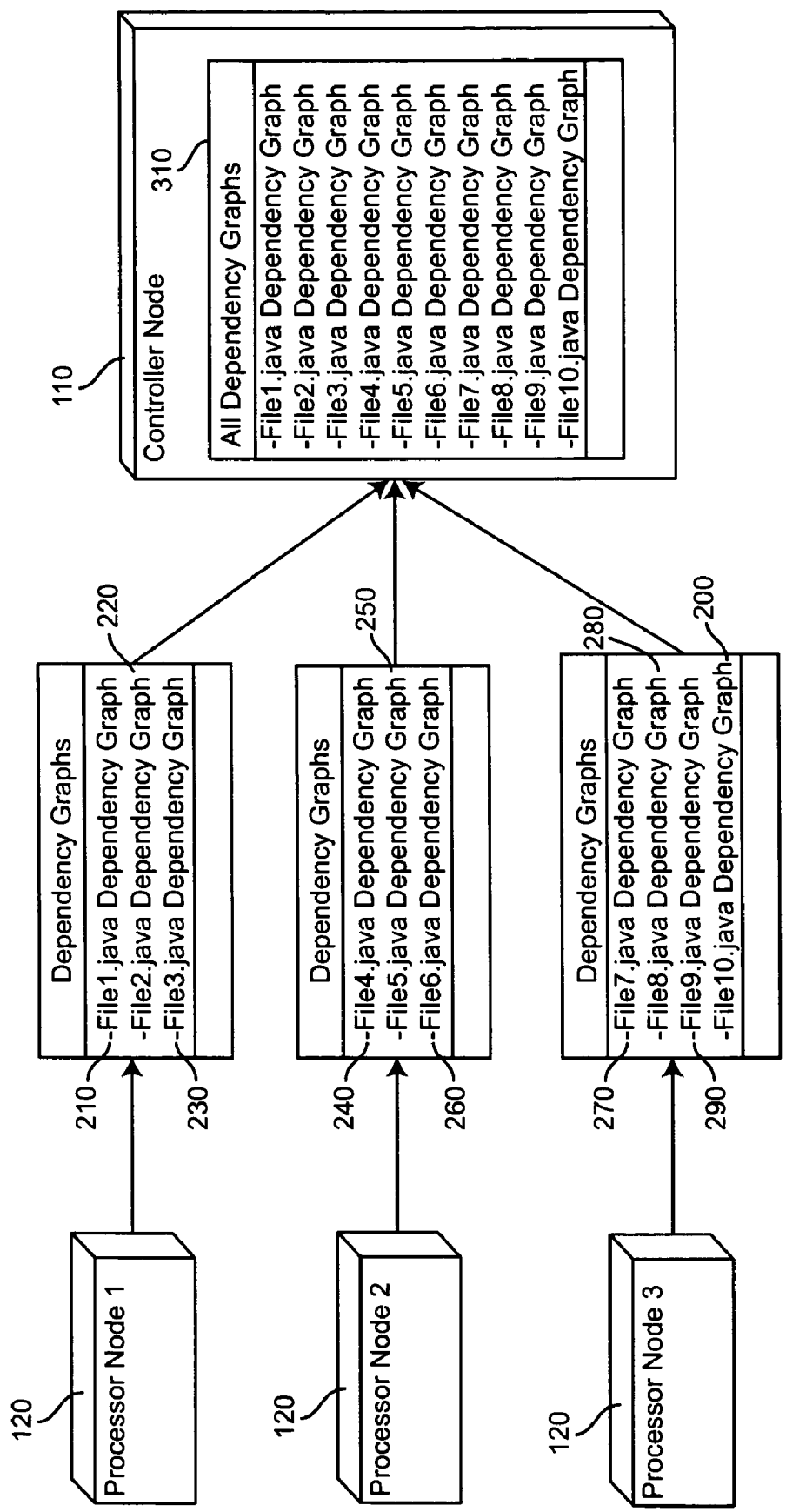
FIG. 3 shows the dependency graphs generated by the respective processor nodes being sent back to the controller node.

5. Each compilation node 120 sends its respective dependency graphs back to the controller node 110. In the example illustrated in FIG. 3, dependency graphs 210, 220 and 230 created for file list 141 by processor node 1, together with dependency graphs 240, 250 and 260 created for file list 142 by processor node 2, and dependency graphs 270, 280, 290 and 200 created for file list 143 by processor node 3, are consolidated 310 at controller node 110.
6. The controller 110 combines the dependency graphs into a master dependency tree, then builds independent, equitably-sized build filesets based upon the dependency tree and prior compilation time information, if available.

Figure 4A:
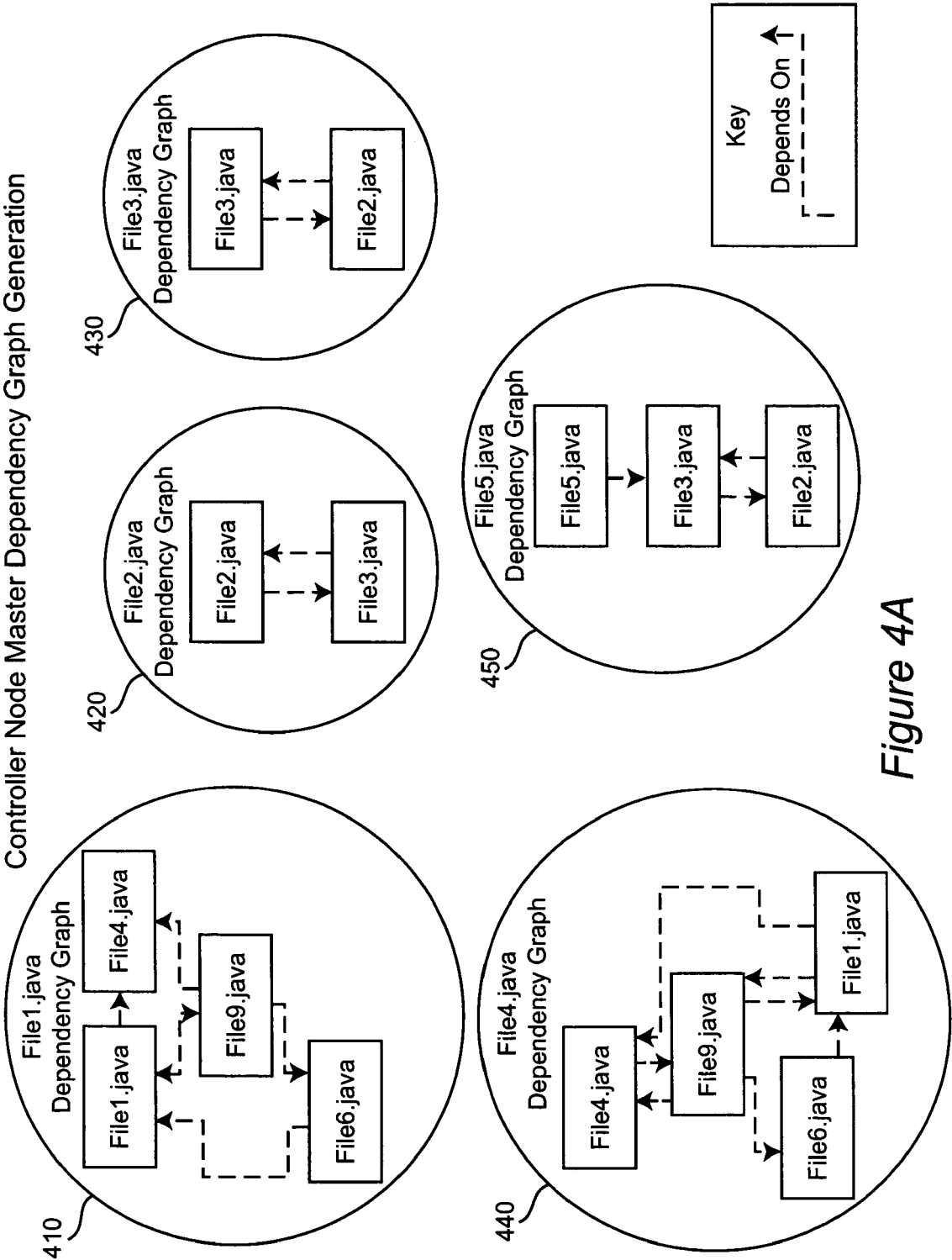
FIGS. 4A and 4B show master dependency graphs generated at the controller node.
Figure 4B:
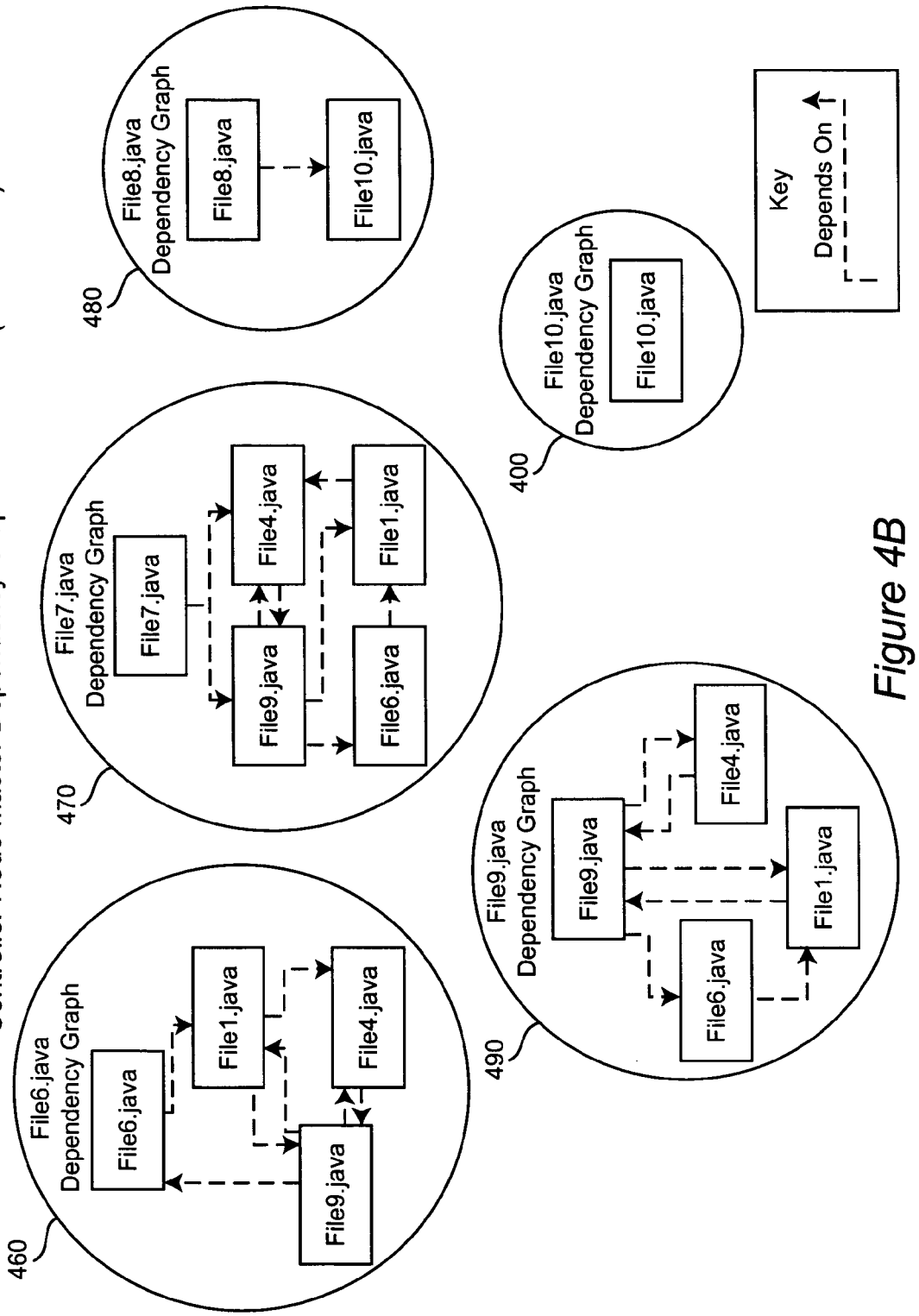

FIGS. 4A and 4B show generation of the master dependency tree for the example, comprising master dependency graphs for all files in complete file list 130: Java1.java master dependency graph 410, Java2.java master dependency graph 420, Java3.java master dependency graph 430, Java4.java master dependency graph 440, Java5.java master dependency graph 450, Java1.java master dependency graph 460, Java7.java master dependency graph 470, Java8.java master dependency graph 480, Java9.java master dependency graph 490, and Java10.java master dependency graph 400. It will be noted in the example that those dependency graphs not showing dependencies on files not included on a segmented file list (i.e. dependency graphs 220 and 230 for file list 141, and dependency graphs 280 and 200 for file list 143) are unchanged in the master dependency graph generation step, while those dependency graphs showing dependencies on files not included on a segmented file list are augmented to reflect any additional dependencies of those files not included on a segmented file list (i.e. dependency graph 210 from file list 141 is augmented to master dependency graph 410, dependency graphs 240 and 250 from file list 142 are augmented to master dependency graphs 440 and 450, respectively, and dependency graphs 260, 270 and 290 from file list 143 are augmented to master dependency graphs 460, 470 and 490, respectively).

The independent build filesets for the example are shown in FIG. 5. It will be observed that the dependencies shown in master dependency graphs 420, 430 and 450 for the set of files Java2.java, Java3.java and Java5.java are encapsulated in a build fileset 510 having no dependency on files not within the set. Similarly, the dependencies shown in master dependency graphs 410, 440, 460, 470 and 490 for the set of files Java1.java, Java4.java, Java6.java, Java7.java and Java9.java are encapsulated in a build fileset 520 also having no dependency on files not within the set. Finally, the dependencies shown in master dependency graphs 480 and 400 for the set of files Java8.java and Java10.java are encapsulated in a build fileset 530 also having no dependency on files not within the set.

Figure 6:
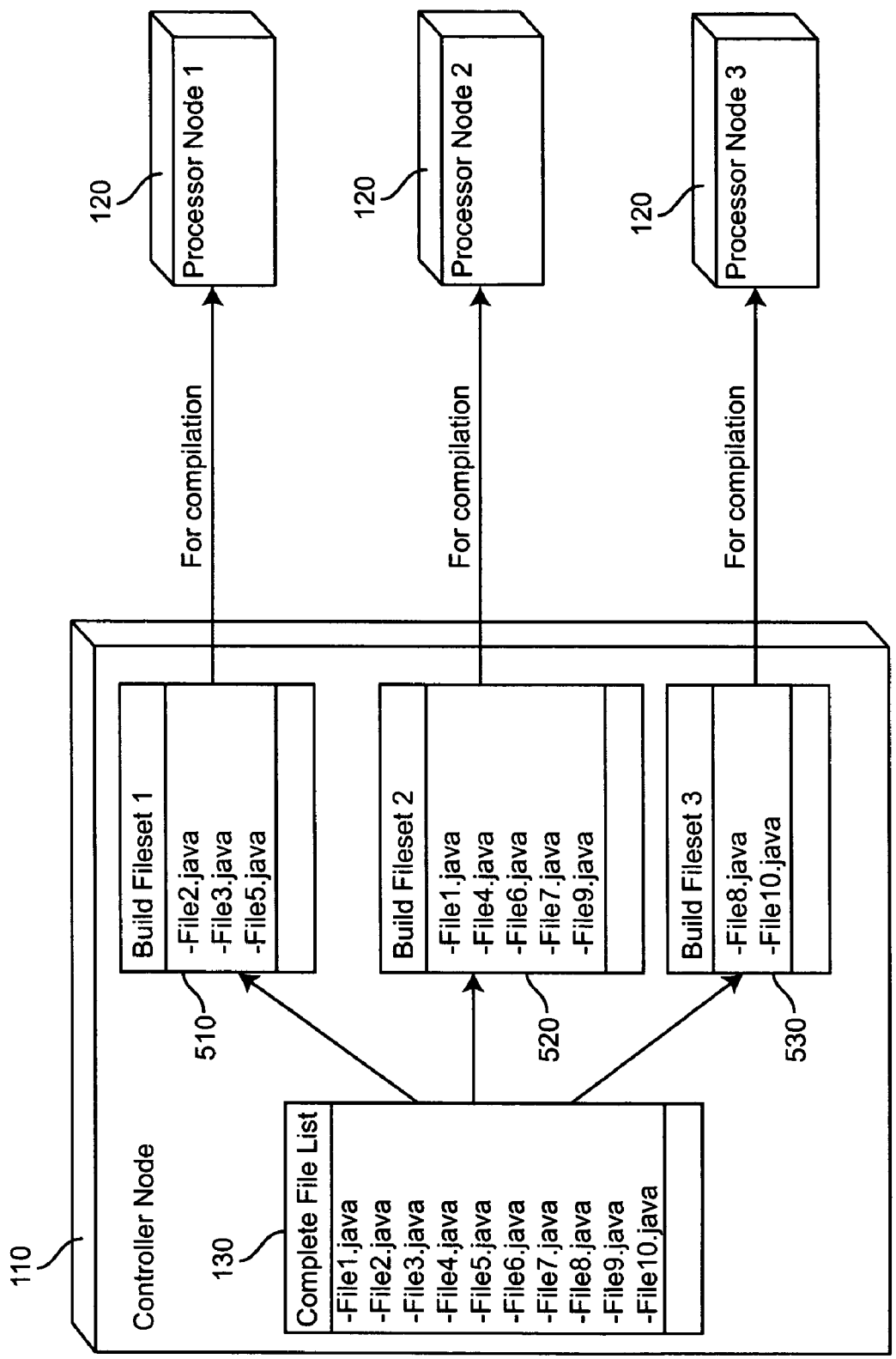
FIG. 6 is a flow chart showing distribution of the independent build sets to the processor nodes for compilation.
Figure 7:
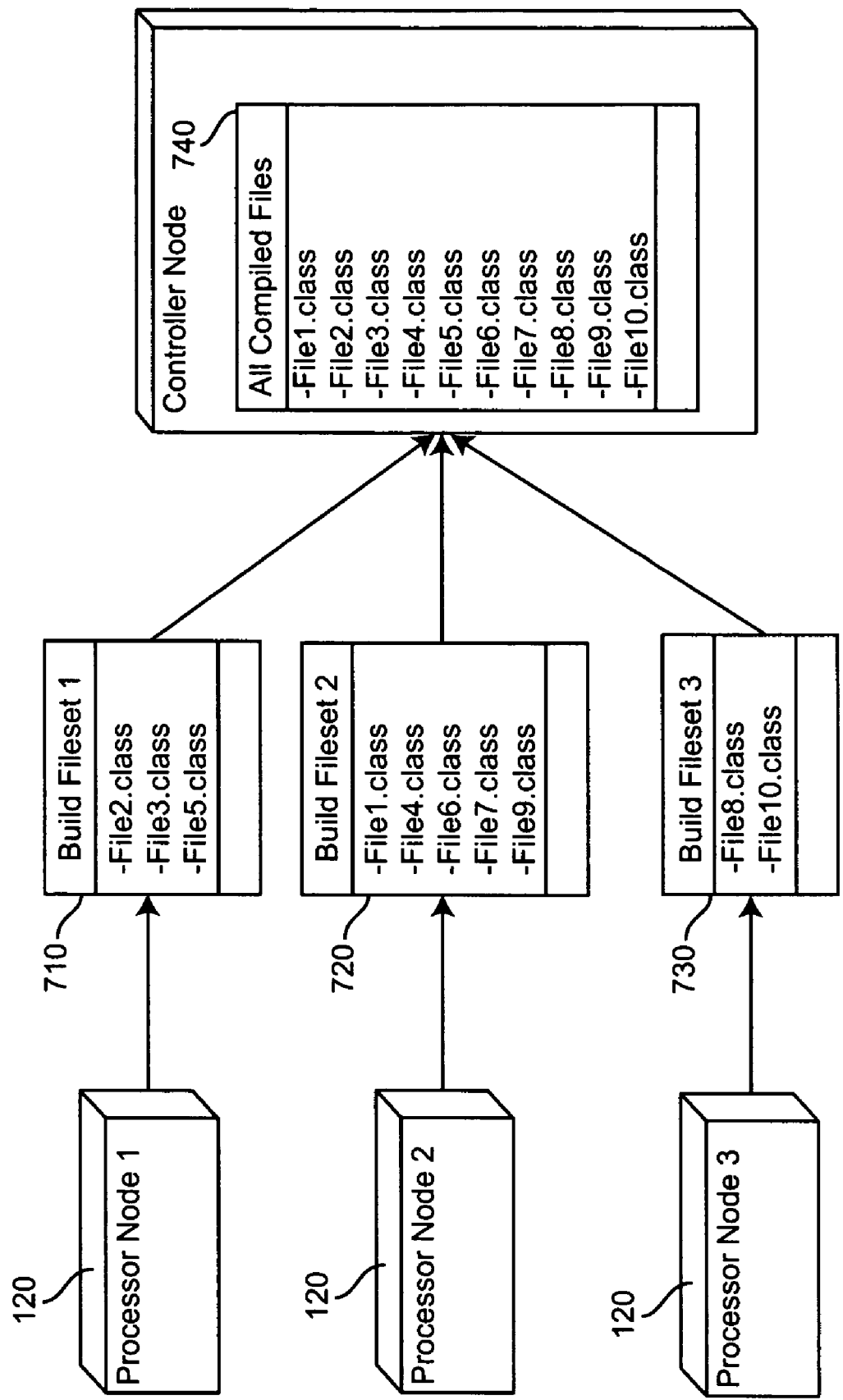
FIG. 7 is a flow chart showing return of compiled files from the processor nodes to the controller node.

7. The controller 110 sends each build fileset to a respective compilation node 120. In the example, as shown in FIG. 6, the three build filesets 510, 520 and 530 are sent to different compilation nodes. Also, it will be observed that because there are only three independent build filesets in the example, the objective of equitable distribution of the compilation may be limited. In general, however, in a large Java project there may be more independent build filesets than processor nodes, and greater flexibility to optimize distribution equity.
8. Each compilation node 120 builds each file in the build fileset, for each fileset sent to that node, recording actual compilation time.
9. Compilation targets (and compilation times) from the compilation nodes 120 are reaped back to the controller 110. For the example, this step is shown in FIG. 7. Compiled files 710 contain the builds for each file in the buildset 510; compiled files 720 contains the builds for each file in the buildset 520; and compiled files 730 contains the builds for each file in the buildset 530.
10. Post-compilation tasks are executed by the controller 110.

The invention uses the following components.

The invention is operable on a grid or cluster of systems capable of performing Java compilations and capable of executing a Java dependency scanner. The grid or cluster comprises a potentially large and dynamically sized group of machines. The Java dependency scanner serves to determine the interrelationship of Java source files. One of these systems is designated as a controller node. Each system that performs compilation includes every compilable unit, synchronized using an external process such as distributed file system, an "rsync" of the build tree, or individual code extracts on each machine. The invention also assumes that all required dependent libraries exist on each of the build machines.

A build tree scanner runs at the controller node. The scanner ascertains the length of each source file and the total number of source files. A number of filesets commensurate with the number of available build machines are constructed. Each fileset contains an equitable distribution of files based on file lengths. Equitable distribution may also be based on the relative resource capacities of the processors used for running the dependency scans, with the objective of roughly equalizing the estimated time for the various processors to perform their respective scans.

Each build machine is instructed to scan each file in its allocated fileset for dependency information, and build a dependency tree for each, consisting of a dependency graph for each file in the fileset. Upon completion of these tasks on the fileset each build machine then sends the dependency tree to the controller. The controller then builds a master dependency tree. From this master dependency tree, build filesets are generated by the controller node. Filesets are created with the most independent build sets possible. That is, if a build set can be broken down into two or more independent build sets, that will be done in order to minimize building the same set of files on multiple machines. Further optimization is possible by taking into account the relative resource capabilities of the various processors doing the compiling, so that a measure equitable allocation of build sets is the time estimated to complete the build.

It is possible to have more build filesets than build nodes. Also, if a shared dependency exists among multiple files, the controller may determine that, in order to build equitable filesets, shared dependency will be built on multiple machines (i.e. included in multiple filesets). Some files that need to be built will have a common dependency amongst files in more than one fileset. If this is the case, no effort is undertaken to compile such a file once and then share the resultant class file with the other nodes. Instead, the file is merely built on multiple machines and used at each respective machine.

The build filesets are then sent to the build systems in a master-slave parallel pattern. The distribution mechanisms will be what is most appropriate, given the grid or cluster upon which the compilation system runs. Each build system tracks the amount of time taken to build each file. This information is sent back to the controller to optimize subsequent compilations, and in particular to improve the equitable distribution of build sets.

Once all filesets are built, the targets are reaped and placed onto the controller node. That is, in order to turn the class files that have been created on the various compilation nodes into something usable in a Java system, these files must be placed on the controller node 110.

The controller node will perform post-compile tasks. Post-compilation tasks may include creation of a JAR (Java archive) file, or a WAR (web archive) file, or EAR (enterprise archive) file, installation, or other non-compilation targets. These are the tasks that turn the work of compilation into a finished product.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method of compiling a Java project in a multiprocessor environment, the computer performing the steps comprising:
  accumulating by automatic means at a central processor location file dependency knowledge for target files in said Java project that have changed since a last compilation. said target files being segmented for respective distribution to respective processor nodes for generation of respective dependency graphs for each target file in said segment. said graphs identifying for each target file dependencies on files not included in said respective segmented lists; and
  creating by automatic means independent build filesets based on said dependency knowledge and equitably allocating by automatic means said build filesets to a plurality of compilation nodes for compilation of said target files, there being created from said respective dependency graphs master dependency graphs which are augmented to reflect additional dependencies of files not included on a respective segmented list, each said build fileset having no dependency on files not within the set, each said compilation node being one of a plurality of processor nodes in said multiprocessor environment and being capable of performing a Java compilation, said Java compilation being subject to an automatic dependency determination,
  wherein said accumulating step further comprises the steps of:
  selecting one of said plurality of processor nodes as a controller node, said controller node serving as said central processor location;
  running a build tree scanner on said Java project at said controller node, thereby identifying said target files;
  segmenting a list of said target files at said controller node and equitably distributing each segment to a respective one of said processor nodes, each respective processor node being provided synchronized access to every compilable unit in said Java project and being capable of executing a Java dependency scanner;
  building a dependency tree at each respective processor node, each said tree comprising dependency graphs for each file in the list segment distributed to the respective processor node, and sending each said dependency tree to said controller node; and
  combining at the controller node each said dependency tree into a master dependency tree comprising all of said dependency graphs.

2. A method of compiling a Java project in a multiprocessor environment as in claim 1, further comprising the step of performing post compile tasks at said controller node.

3. A method of compiling a Java project in a multiprocessor environment as in claim 1, wherein said equitable allocation step uses prior compilation time information, if such time information is available from a reaping step in a prior compilation.

4. A method of compiling a Java project in a multiprocessor environment as in claim 2, wherein said step of performing post compile tasks includes reaping by automatic means to said central location target files compiled by each of said compilation nodes.

5. A method of compiling a Java project in a multiprocessor environment as in claim 1, wherein said segmenting step uses information about processing resources of each said respective processing node, said equitable distribution of list segments being measured by a time estimated for each said respective processing node to build said dependency tree.

6. A method of compiling a Java project in a multiprocessor environment as in claim 1, wherein said allocating step uses information about processing resources of each said compilation node, said equitable allocation of build filesets being measured by a time estimated for each said compilation node to compile said target files.

7. A computer implemented system for compiling a Java project in a multiprocessor environment, the means for implementation being provided by a computer, comprising:
   automatic means for accumulating at a central processor location file dependency knowledge for target files in said Java project that have changed since a last compilation, said target files being segmented for respective distribution to respective processor nodes for generation of res respective dependency graphs for each target file in said segment, said graphs identifying for each target file dependencies on files not included in said respective segmented lists; and
   automatic means for creating independent build filesets based on said dependency knowledge and for equitably allocating said build filesets to a plurality of compilation nodes for compilation of said target files, there being created from said respective dependency graphs master dependency graphs which are augmented to reflect additional dependencies of files not included on a respective segmented list, each said build fileset having no dependency on files not within the set, each said compilation node being one of a plurality of processor nodes in said multiprocessor environment and being capable of performing a Java compilation, said Java compilation being subject to an automatic dependency determination,
   wherein said accumulating means further comprises:
   means for selecting one of said plurality of processor nodes as a controller node, said controller node serving as said central processor location;
   means for running a build tree scanner on said Java project at said controller node, thereby identifying said target files;
   means for segmenting a list of said target files at said controller node and for equitably distributing each segment to a respective one of said processor nodes, each respective processor node being provided synchronized access to every compilable unit in said Java project and being capable of executing a Java dependency scanner;
   means for building a dependency tree at each respective processor node, each said tree comprising dependency graphs for each file in the list segment distributed to the respective processor node, and for sending each said dependency tree to said controller node; and
   means for combining at the controller node each said dependency tree into a master dependency tree comprising all of said dependency graphs.

8. A system for compiling a Java project in a multiprocessor environment as in claim 7 further comprising means for performing post compile tasks at said controller node.

9. A system for compiling a Java project in a multiprocessor environment as in claim 7 wherein said equitable allocation means uses prior compilation time information, if such time information is available from a prior compilation.

10. A system for compiling a Java project in a multiprocessor environment as in claim 8, wherein said means for performing post compile tasks includes means for reaping to said central location target files compiled by each of said compilation nodes.

11. A system for compiling a Java project in a multiprocessor environment as in claim 7, wherein said segmenting means uses information about processing resources of each said respective processing node, said equitable distribution of list segments being measured by a time estimated for each said respective processing node to build said dependency tree.

12. A system for compiling a Java project in a multiprocessor environment as in claim 7, wherein said allocating means uses information about processing resources of each said compilation node, said equitable allocation of build filesets being measured by a time estimated for each said compilation node to compile said target files.

13. A computer implemented system for compiling a Java project in a multiprocessor environment, said computer system having software modules stored thereon and having a processor operable to execute the software modules, the software modules comprising:
   first computer code for accumulating at a central processor location file dependency knowledge for target files in said Java project that have changed since a last compilation, said target files being segmented for respective distribution to respective processor nodes for generation of respective dependency graphs for each target file in said segment, said graphs identifying for each target file dependencies on files not included in said respective segmented lists; and
   second computer code for creating independent build filesets based on said dependency knowledge and for equitably allocation said build filesets to a plurality of compilation nodes for compilation of said target files, there being created from said respective dependency graphs master dependency graphs which are augmented to reflect additional dependencies of files not included on a respective segmented list, each said build fileset having no dependency on files not within the set, each said compilation node being one of a plurality of processor nodes in said multiprocessor environment and being capable of performing a Java compilation, said Java compilation being subject to an automatic dependency determination,
   wherein said first computer code further comprises:
   third computer code for selecting one of said plurality of processor nodes as a controller node, said controller node serving as said central processor location;
   fourth computer code for running a build tree scanner on said Java project at said controller node, thereby identifying said target files;
   fifth computer code for segmenting a list of said target files at said controller node and for equitably distributing each segment to a respective one of said processor nodes, each respective processor node being provided synchronized access to every compilable unit in said Java project and being capable of executing a Java dependency scanner;
   sixth computer code for building a dependency tree at each respective processor node, each said tree comprising dependency graphs for each file in the list segment distributed to the respective processor node, and for sending each said dependency
   tree to said controller node; and
   seventh computer code for combining at the controller node each said dependency tree into a master dependency tree comprising all of said dependency graphs.

14. A computer implemented system for compiling a Java project in a multiprocessor environment as in claim 13, further comprising eighth computer code for performing post compile tasks at said controller node.

15. A computer implemented system for compiling a Java project in a multiprocessor environment as in claim 14, wherein said eighth computer code for performing post compile tasks includes ninth computer code for reaping to said central location target files compiled by each of said compilation nodes.

16. A computer implemented system for compiling a Java project in a multiprocessor environment as in claim 13, wherein said fifth computer code for segmenting uses information about processing resources of each said 4 respective processing node, said equitable distribution of list segments being measured by a time estimated for each said respective processing node to 6 build said dependency tree.

17. A computer implemented system for compiling a Java project in a multiprocessor environment as in claim 13, wherein said second computer code uses information about processing resources of each said compilation node, said equitable allocation of build filesets being measured by a time estimated for each said compilation node to compile said 6 target files.

\* \* \* \* \*